Figure 1:
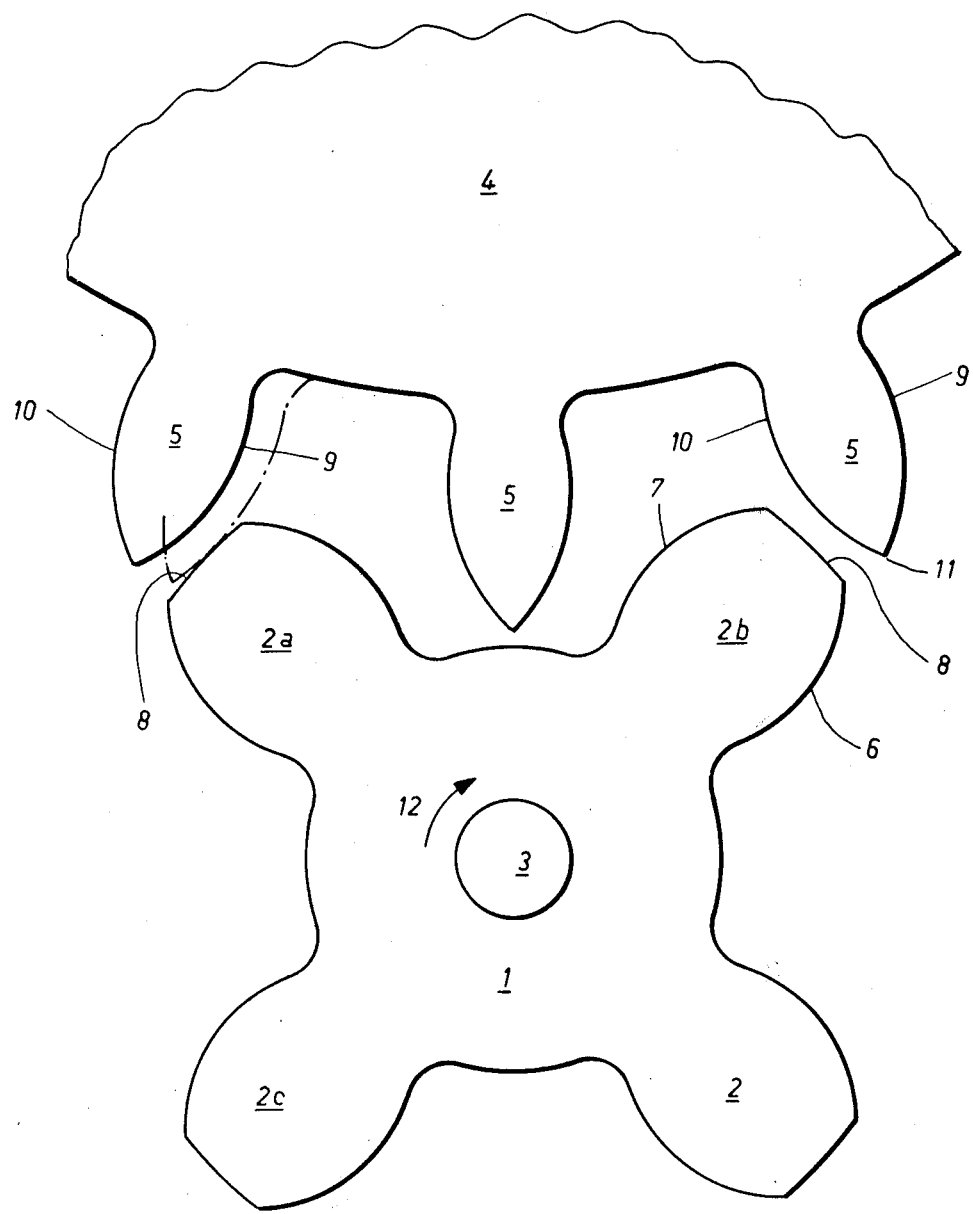

United States Patent [19]

Vuilleumier

[11] 4,321,839
[45] Mar. 30, 1982

[54] MONODIRECTIONAL TORQUE-TRANSMISSION GEAR

[75] Inventor: Cyril Vuilleumier, Bienne, Switzerland

[73] Assignee: Societe Suisse pour l'Industrie Horlogere Management Services S.A., Bienne, Switzerland

[21] Appl. No.: 127,500

[22] Filed: Mar. 5, 1980

[30] Foreign Application Priority Data

Mar. 8, 1979 [FR] France ................ 79 5930

[51] Int. Cl.³ .............................................. F16H 55/06
[52] U.S. Cl. ........................................ 74/462; 368/220
[58] Field of Search ................ 74/84 R, 411.5, 421 R, 74/436, 460, 462, 437; 368/220

[56] References Cited

U.S. PATENT DOCUMENTS

| | | | |
|---|---|---|---|
| 784,813 | 3/1905 | Spiller | 74/462 |
| 2,064,699 | 12/1936 | Stahl et al. | 74/462 |
| 2,436,231 | 2/1948 | Schellens | 74/462 |
| 2,752,751 | 7/1956 | Vaucher | 74/462 |
| 4,041,794 | 8/1977 | Belot et al. | 74/462 |
| 4,051,744 | 10/1977 | Oshima | 74/462 |
| 4,108,016 | 8/1978 | Muranishi | 74/462 |
| 4,200,000 | 4/1980 | Fluehmann | 74/462 |

FOREIGN PATENT DOCUMENTS

| | | | |
|---|---|---|---|
| 5583 | 6/1879 | Fed. Rep. of Germany | 74/462 |
| 321237 | 4/1957 | Switzerland . | |
| 599485 | 5/1978 | Switzerland . | |
| 1201913 | 8/1970 | United Kingdom | 74/411.5 |

*Primary Examiner*—Lawrence J. Staab
*Attorney, Agent, or Firm*—Stevens, Davis, Miller & Mosher

[57] ABSTRACT

A stepping motor causes a driving pinion to rotate by steps of 90°, the stopping position being such that a driven pinion is blocked with a very small backlash by the pressure of a tooth of the driven pinion against the top face of one of the teeth of the driving pinion. Both pinions have simple teeth with conventional profiles capable of being cut by means of a worm-hob. The pitch of the driving pinion is between one and two times that of the driven pinion, and the layouts of the teeth are such that the arc along which a tooth of the driving pinion engages the teeth of the driven pinion includes a portion tranversed freely and a portion along which the driving pinion rotates the driven pinion by one step of its toothing.

8 Claims, 3 Drawing Figures

MONODIRECTIONAL TORQUE-TRANSMISSION GEAR

This invention relates to monodirectional torque-transmission gears, particularly for causing a gear-train of a precision mechanism to be driven by a stepping motor, of the type comprising a driving pinion rotating step by step and a driven pinion meshing with the driving pinion, each pinion being provided with a toothing composed of identical and equidistant teeth.

Gear-trains for electronic watches having stepping motors must be designed in such a way that each driving pinion is capable of rotating the driven pinion with which it meshes in both directions of rotation, but that during at least one stage of their engagement, if a disturbing torque is transmitted from the driven pinion to the driving pinion, the teeth of the pinions are blocked so that this torque is not transmitted to the motor.

The reason for this requirement is that in small electronic watches, e.g., ladies' watches, the unbalance of the minute hand may exert a torque which, if transmitted via the dial-train to the shaft of the motor, is liable to cause untimely stepping of the motor. As it is not possible to prevent transmission of this torque by means of a brake acting on the center wheel or some other element of the gear-train because this would overload the motor, efforts have been made to develop so-called monodirectional torque-transmission gears, i.e., gears which are blocked if the driven pinion starts to act upon the driving pinion. Gears of this type are described, for instance, in Swiss Pat. No. 599,485. They comprise teeth situated at two different levels on both the driving pinion and the driven pinion, so that they tend to be bulky and complicated to machine.

An arrangement which likewise constitutes a monodirectional torque-transmission gear is described in Swiss Pat. No. 321,237 in connection with a mechanism for driving a calendar. Here, the teeth are bounded by surfaces generated by straight lines parallel to the axes of the gears; but these teeth are asymmetrical, so that they cannot be cut by means of a worm-hob. Thus, expensive operations are also required to produce these gears.

So-called Maltese-cross gears and their known variations are also used to advance a driven pinion intermittently. The driven pinion is blocked so that it cannot rotate in any direction during the period when it does not mesh with the tooth of the driving pinion. However, apart from the fact that a Maltese-cross gear would not be suitable for causing a driven pinion to be rotated by a driving pinion advancing step by step, a Maltese-cross toothing exhibits complicated shapes which also preclude cutting by means of a worm-hob.

In the field of winch gears, toothings designed to block spontaneously in response to a reverse movement have long been known. Thus, German Patent No. 5583 describes a gear of this kind in which the teeth of the two meshing gearwheels have cylindrical top faces. However, this gear is designed in such a way that for certain positions of the driving wheel, a reversal of the torque first causes rotation of the two gearwheels along a relatively long arc before blocking occurs. This is naturally unacceptable when it is desired to avoid the effects of the unbalance of the minute hand in the gear-train of a quartz wrist watch having a stepping motor.

German Disclosed application (DOS) No. 26 04741 proposes a gear suitable for use in a timepiece movement, in which the teeth of the driving pinion are pointed, the design of the toothings being such that the gear blocks in certain relative positions if the driven pinion is subjected to a torque in the direction opposite to that imparted by the driving pinion. However, because the teeth of the driving pinion are pointed, the dependability of the blocking is uncertain, above all in the case of mass-production.

German Disclosed application (DOS) No. 27 09348 also discloses a gear-train for an electronic watch designed in such a way that in certain positions of the driving pinion, one of its teeth constitutes a stop element capable of restraining the driven pinion if the latter is subjected to an opposing torque. In this case, too, depending upon the position of the teeth at the moment when the torque reversal takes place, the driven pinion may move backward to a relatively large extent.

It is an object of this invention to provide a gear of the type initially mentioned which lends itself to use with a stepping motor driving the gear-train of an electronic watch in which the driving pinion is keyed on the shaft of the stepping motor.

It is a further object of this invention to provide a gear of this type having the particularly that when an opposing torque is exerted upon the driven pinion, the angular displacement which this pinion undergoes before blocking intervenes is small.

Still another object of this invention is to provide a gear of the aforementioned type which can be manufactured for use in small watch movements and which comprises toothings having a simple, symmetrical form suitable for cutting by means of a worm-hob.

To this end, in the gear according to the present invention, the teeth of both toothings are symmetrical, the pitch of the driving pinion is between one and two times of the pitch of the driven pinion, and the arc along which the teeth of the driving pinion engage the toothing of the driven pinion includes an arc segment traversed freely without rotating the driven pinion and an arc segment of rotation along which the engaged tooth causes the driven pinion to advance by one step of its toothing, the shapes of the teeth being such that in each stopping position of the driving pinion, two of its teeth prevent the driven pinion from moving in one direction or the other under the influence of a disturbing torque.

Figure 2:
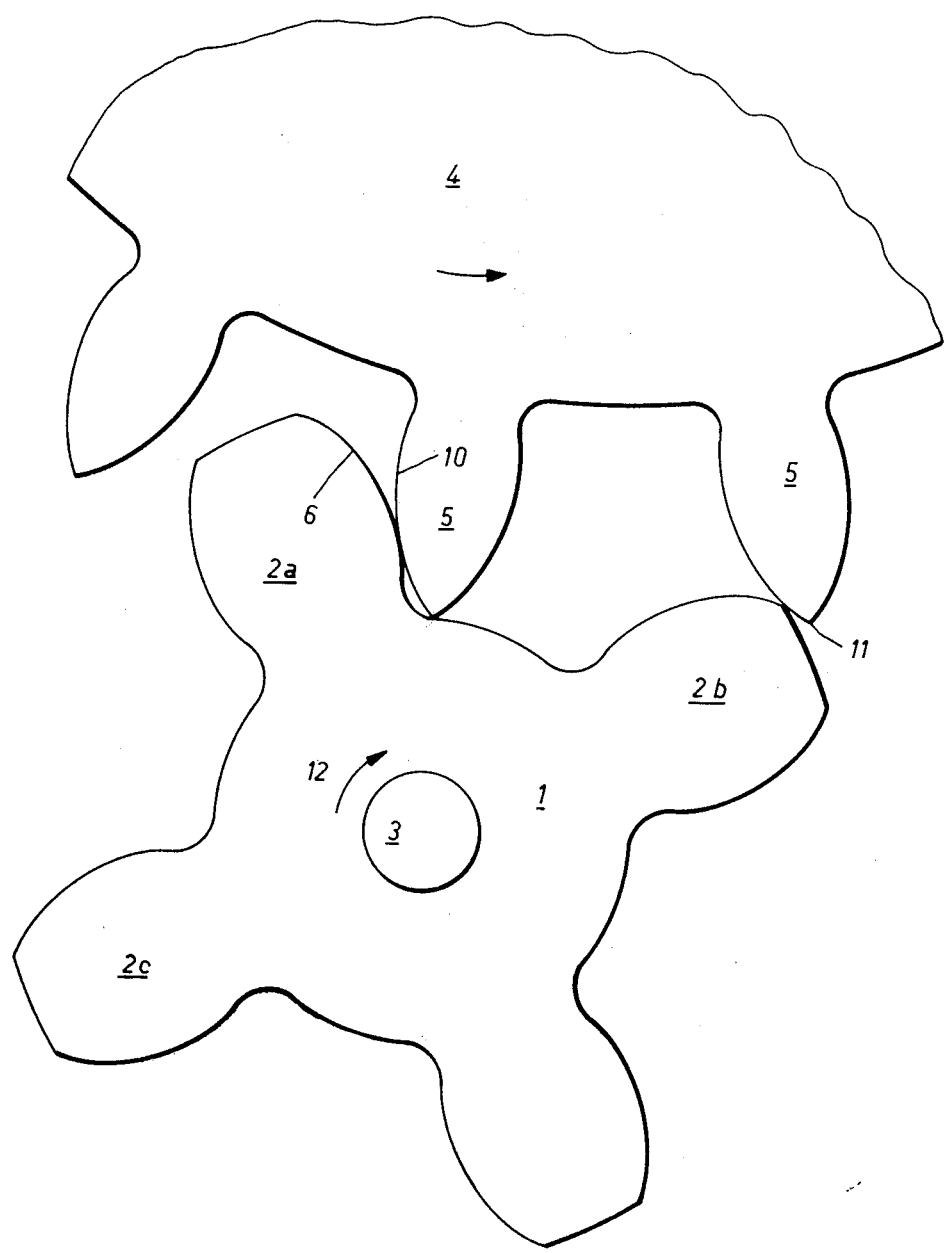
Figure 3:
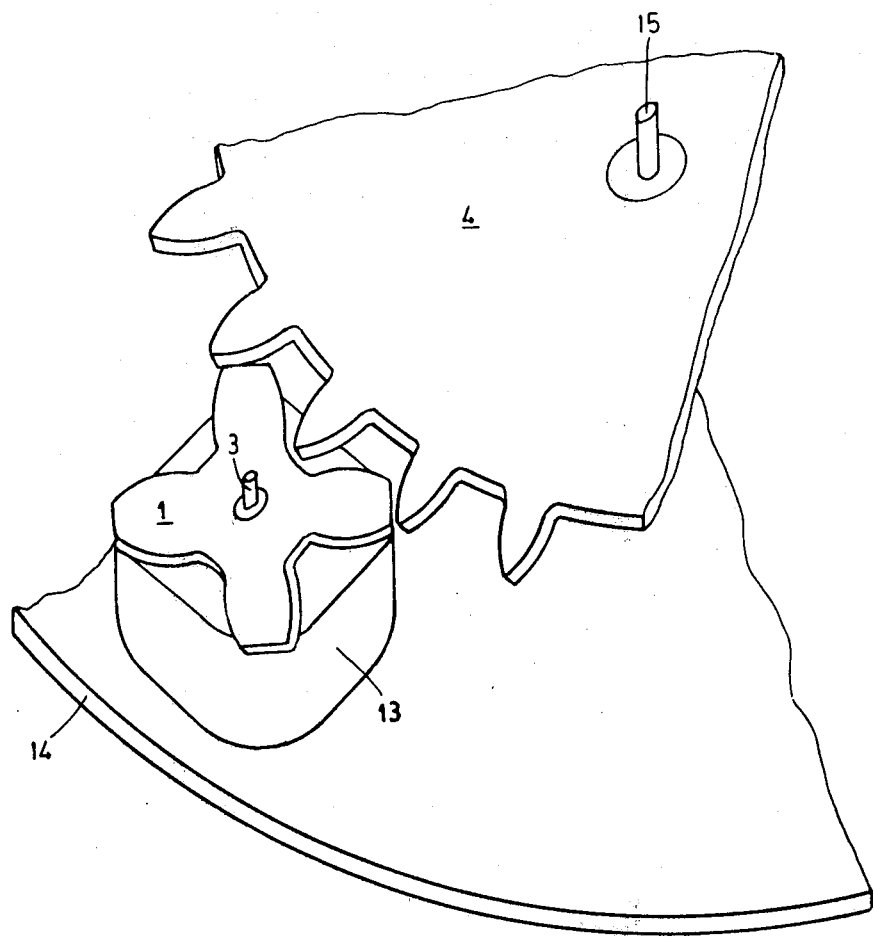

A preferred embodiment of the invention will now be described in detail with reference to the accompanying drawings, in which:

FIG. 1 is a partial top plan view on a large scale, showing the driving pinion in one of its stopping positions, FIG. 2 is a view analogous to FIG. 1, showing the relative positions of the driving pinion and the driven pinion during the course of rotation of the driving pinion from one of its stopping positions to the next, and FIG. 3 is a partial perspective view on a smaller scale, showing certain elements of a wrist watch movement equipped with the gear of FIG. 1.

The gear illustrated in the drawings comprises a driving pinion 1 having four teeth 2 and keyed on a shaft 3 of a stepping motor in a small quartz timepiece movement having hands, e.g., the movement of a ladies' wrist watch. The driving pinion 1 rotates a driven pinion 4, e.g., an idle pinion or a fourth wheel. The manner in which the driven pinion 4 pivots is not shown because it is not necessary for the understanding of the invention. The pinion 4 includes a toothing composed of teeth 5, of which there are 18 in the embodiment being described.

In FIG. 1, the driving pinion 1 is shown in one of its four stopping positions. The stepping motor makes a quarter of a revolution each second and pauses after each such step in an orientation such as that shown in FIG. 1. The position in which the driven pinion 4 is shown in FIG. 1 is a theoretical one midway along the maximum distance it can travel when—the driving pinion 1 having come to a stop as shown in the drawing—the two teeth 5 respectively facing the teeth 2a and 2b move to the points where they come in contact with the latter. The teeth 2a and 2b determine the possible backlash of the pinion 4.

Each of the teeth 2 has two flanks 6 and 7, the profiles of which are conventionally cycloidal or involute, for example. The topland or topface 8 of each tooth 2 is a surface segment of an imaginary cylinder coaxial with the pinion 1 and having a radius equal to that of the addendum-circle of the toothing. The width of the teeth 2, i.e., the distance between the flanks 6 and 7 measured along the pitch-circle, is less than the tooth-space, i.e., the distance between the facing flanks of two adjacent teeth 2 measured along the pitch-circle.

The same applies to the teeth 5. Their flanks 9 and 10 also have conventional profiles; but unlike the flanks 6 and 7 of the teeth 2, the flanks 9 and 10 meet on the addendum-circle of the pinion 4 to form a ridge 11. Thus, the teeth 5 are pointed teeth. Their width is also less than the tooth-space.

It is important to note that the pitch of the toothing 2 is between one and two times the pitch of the toothing 5. Moreover, the toothings are so designed that when the pinion 1 is in the position shown in FIG. 1, the pinion 4 is blocked with minimal backlash. Two adjacent teeth 2a and 2b of the pinion 1 block the pinion 4 by means of their top faces 8 whatever the direction of rotation of the pinion 4 tends to be. In one direction, the flank 9 of a tooth 5 comes up against the top face 8 of a tooth 2a, as shown by a dot-dash line in FIG. 1. Hence this tooth 5 exerts upon the pinion 1 a radial force which effects the blocking. In the other direction, it is the flank 10 of another tooth 5, adjacent to the tooth 2b, which comes up against the top face 8 of this latter tooth. As the teeth are symmetrical, as the top faces 8 are coaxial with the pinion 1, and as the position of the pinion 1 on the shaft 3 is such that when the motor pauses, the teeth are disposed symmetrically with respect to the plane defined by the axes of the pinions 1 and 4, the blocking conditions are the same in both directions. Furthermore, as the flanks 9 and 10 of the teeth 5 are convexly curved surfaces, e.g., cycloidal or involute, they press along a line against one of the faces 8 and thus ensure blocking whatever the position of this line of support.

FIG. 2 illustrates the manner in which the pinion 1 engages the pinion 4 during rotation of the driving pinion 1. Shown here are the relative positions of the two pinions when one of the teeth 5 of the pinion 4 is pressing against the tooth 2b of the pinion 1, and the pinion 1 then rotates in the direction indicated by the arrow 12. The flank 6 of the tooth 2a comes in contact with the flank 10 of the tooth 5 lying in its path. The particular tooth 5 which is facing the tooth 2b will always block the gear if the pinion 4 should be rotated clockwise, while rotation may proceed freely when the pinion 4 is driven counterclockwise by the pinion 1.

Returning to FIG. 1, it will be seen that starting from the position occupied by the pinion 1 in that figure, and whatever the position of the pinion 4 within the backlash-value, the rotation of the pinion 1 in the direction of the arrow 12 includes an arc along which the pinion 1 rotates freely without coming in contact with any tooth 5. Only when the pinion 1 reaches a position corresponding approximately to that shown in FIG. 2 does it come in contact with a tooth 5, and it will be obvious that starting from that point, the pinion 1 will describe an arc along which it will cause the pinion 4 to advance by one step of its toothing. During the course of this rotation, the tooth 2c will assume the position occupied by the tooth 2a in FIG. 1, so that a one-step advance of the pinion 4 will have corresponded to a one-step advance of the pinion 1.

Otherwise, as long as the pinion 1 is in the position shown in FIG. 1, or in one of its homologous positions, it keeps the pinion 4 blocked.

FIG. 3 illustrates the assembly of certain elements of a wrist watch movement equipped with the gear described above. The driving pinion 1 is shown keyed on the shaft 3, which is the rotor shaft of a stepping motor 13 mounted on the plate 14 of the watch movement. Periodically, e.g., every ten seconds, the motor 13 receives a pulse which causes its rotor to turn one-quarter of a revolution. Each time the rotor pauses, the teeth of the pinion 1 are symmetrically oriented on opposite sides of the plane defined by the axes of the shaft 3 and of an arbor 15 supporting the driven pinion 4, part of which is also shown in FIG. 3. The pinion 4 may, for example, be an idle pinion. It has a second toothing, coaxial the first and comprising only a small number of teeth. This second toothing in turn drives with as little backlash as possible a wheel having a bush to which a minute hand is secured.

It will be noted that the motor 13 may be a reversible motor, i.e., one where the direction of rotation may be reversed by very simple means, e.g., by reversing the polarity of the pulses it receives.

Thus, the gear described above is capable of transmitting torque from the driving pinion to the driven pinion in either direction of rotation of the motor, and the gear-train is automatically blocked in the event of torque reversal, i.e., if torque is transmitted from the driven pinion to the driving pinion while the motor is in a stopping position.

As already mentioned above, there are various applications for such a gear in electronic watches, more particularly in small watches having low-powered stepping motors.

By way of example, the layouts of the toothings may be established starting from a normal gear, having a module and a layout selected arbitrarily, by eliminating every other tooth of the driving pinion, widening the teeth of this pinion to create the top faces which ensure blocking, and reducing the number of teeth of the driven pinion, e.g., by one-quarter, to increase their spacing.

As may be seen from the drawing, each tooth of the driving pinion moves one tooth of the driven wheel and causes the latter to advance by one step of its toothing. Thus, the transmission ratio is equal to the ratio of the number of teeth. However, rotation is not continuous, and the driven wheel advances intermittently even if the driving pinion advances continuously.

Starting from a gear having a normal layout, the choice of modified pitch for the driven toothing and of the modified toothing for the teeth of the driven toothing depends upon the profiles and the diametral ratios selected.

With the gear described, the teeth of the driving pinion come in contact with those of the driven pinion at a point situated half a tooth-width before the line of centers, and this determines a favorable path of contact. At each step, the driving pinion rotates the driven wheel until the tooth leading the toothing is in the position of the tooth 2b in FIG. 1. The layouts may be established in such a way that the backlash of the toothings is reduced to the values which are usual in timepiece gears.

What is claimed is:

1. A watch movement including a stepping motor, a gear train driven by said motor and at least one hand secured to one of the gears of said train, wherein said train comprises
   a driving pinion connected to said stepping motor for step-by-step rotation, said driving pinion having a plurality of identical symmetrical, equidistant teeth, each of which includes top faces in the form of surface segments of a cylinder coaxial with said driving pinion, and
   a driven pinion having a plurality of identical symmetrical, equidistant teeth, each of which is pointed,
   said pinions meshing with one another, the pitch of the teeth of said driving pinion being one to two times the pitch of said driven pinion, and the shapes of the teeth of said pinions being such that during each pause in said step-by-step rotation, a first and a second of said pointed teeth of said driven pinion extend in front of the top faces of two adjacent teeth of said driving pinion respectively, and a third of said pointed teeth extends between said two adjacent teeth, thus locking said driven pinion against movement from torques exerted on said driven pinion.

2. The watch movement defined by claim 1, wherein said teeth of said driving pinion have cycloidal profiles.

3. The watch movement defined by claim 1, wherein said teeth of said driving pinion have involute profiles.

4. The watch movement defined in any one of the claims 2 or 3, wherein said teeth of said driven pinion have cycloidal profiles.

5. The watch movement defined in any one of the claims 2 or 3, wherein said teeth of said driven pinion have involute profiles.

6. The watch movement defined by claim 1, wherein said teeth of said driving pinion are fewer in number than said teeth of said driven pinion.

7. The watch movement defined by claim 1, wherein the tooth-spaces of said driving pinion and of said driven pinion are greater than the widths of their respective gear teeth.

8. A watch movement including a stepping motor and a monodirectional, torque-transmitting gear train driven by said motor, wherein said train comprises:
   a driven pinion having a plurality of identical, symmetrical and equally spaced teeth having a certain pitch;
   a driving pinion connected to said stepping motor for step-by-step rotation thereby, said driving pinion having a plurality of identical, symmetrical, and equally spaced teeth which mesh with the teeth of the driven pinion and whose pitch is one to two times the pitch of the teeth on the driven pinion, wherein each of said driving pinion teeth includes a top face in the form of a surface segment of a cylinder coaxial with said driving pinion for positively locking the movement of the driven pinion with minimal and equal backlash in either direction around the axis of rotation of said driven pinion when a torque is exerted onto the driven pinion by a source other than said stepping motor is engaging a top face of one of the teeth of the driving pinion when the teeth of the driven pinion and driving pinion are meshed in a locking position wherein during each pause in said step-by-step rotation a first and a second and said driven pinion teeth extend in front of the two top faces of two adjacent driving pinion teeth of said driving pinion while a third of said driven pinion teeth extends between said two adjacent driving pinion teeth.

* * * * *